United States Patent [19]

Cocchi

[11] Patent Number: 5,312,184

[45] Date of Patent: May 17, 1994

[54] ICE-CREAM STIRRING DEVICE WITH STIRRING BLADES AND SCRAPING VANES

[75] Inventor: Gino Cocchi, Bolonga, Italy

[73] Assignee: Carpigiani S.r.l., Anzola Emilia, Italy

[21] Appl. No.: 949,626

[22] PCT Filed: Mar. 3, 1992

[86] PCT No.: PCT/EP92/00467

§ 371 Date: Dec. 7, 1992

§ 102(e) Date: Dec. 7, 1992

[87] PCT Pub. No.: WO92/15201

PCT Pub. Date: Sep. 17, 1992

[30] Foreign Application Priority Data

Mar. 8, 1991 [IT] Italy .................. GE91A000047

[51] Int. Cl.⁵ .................. A23G 9/12; A23G 9/22
[52] U.S. Cl. .................. 366/302; 366/310; 366/311; 366/313; 366/320; 62/343
[58] Field of Search .................. 366/64, 66, 67, 99, 366/144, 149, 194–196, 302, 309–313, 319, 320; 62/68, 342, 343, 354, 381; 165/94

[56] References Cited

U.S. PATENT DOCUMENTS

| 2,079,272 | 5/1937 | Arndt . | |
|---|---|---|---|
| 2,538,716 | 1/1951 | Wakeman | 62/342 |
| 2,740,264 | 4/1956 | Thompson, Jr. | 62/343 X |
| 2,746,730 | 5/1956 | Swenson et al. | 62/343 X |
| 2,810,557 | 10/1957 | Phelan | 366/320 X |
| 2,836,401 | 5/1958 | Phelan | 366/320 X |
| 2,847,197 | 8/1958 | Thompson, Jr. . | |
| 3,061,281 | 10/1962 | Phelan et al. | 366/320 X |
| 3,235,002 | 2/1966 | Bevarly et al. | 165/94 |
| 3,385,354 | 5/1968 | Bevarly | 165/94 |
| 3,641,783 | 2/1972 | Werner | 62/343 |
| 3,848,289 | 11/1974 | Bachmann | 62/354 X |
| 4,162,127 | 7/1979 | Wakeman et al. | 366/149 |
| 4,241,590 | 12/1980 | Martineau | 62/343 |
| 4,698,984 | 10/1987 | Manfroni | 366/149 X |
| 5,074,125 | 12/1991 | Schifferly | 366/312 X |

FOREIGN PATENT DOCUMENTS

| 655025 | 2/1965 | Belgium . | |
|---|---|---|---|
| 229371 | 7/1987 | European Pat. Off. . | |
| 497336 | 8/1992 | European Pat. Off. | 62/342 |
| 1928901 | 12/1970 | Fed. Rep. of Germany . | |
| 3000882 | 7/1980 | Fed. Rep. of Germany . | |
| 1220929 | 1/1960 | France . | |
| 1269455 | 10/1989 | Japan | 62/343 |
| 1151611 | 5/1969 | United Kingdom . | |
| 2232469 | 12/1990 | United Kingdom . | |

Primary Examiner—Harvey C. Hornsby
Assistant Examiner—Charles Cooley
Attorney, Agent, or Firm—Larson and Taylor

[57] ABSTRACT

Stirring device for machines for the manufacture of ice-cream, of the type with a whipping cylinder (1) with a horizontal axis, provided with a device for extraction of the ice-cream at one head side. The stirrer consists of two stirring blades (7) of helical shape which are arranged diametrically opposite one another and extend over the entire length of the whipping cylinder at a slight distance from the internal wall of same. The stirring blades (7) are supported on a hub (8) which is integral with the operating shaft (9), while there is provided between the two stirring blades (7) a plurality of scraping vanes (11) which are capable of interacting with the internal wall of the whipping cylinder.

23 Claims, 4 Drawing Sheets

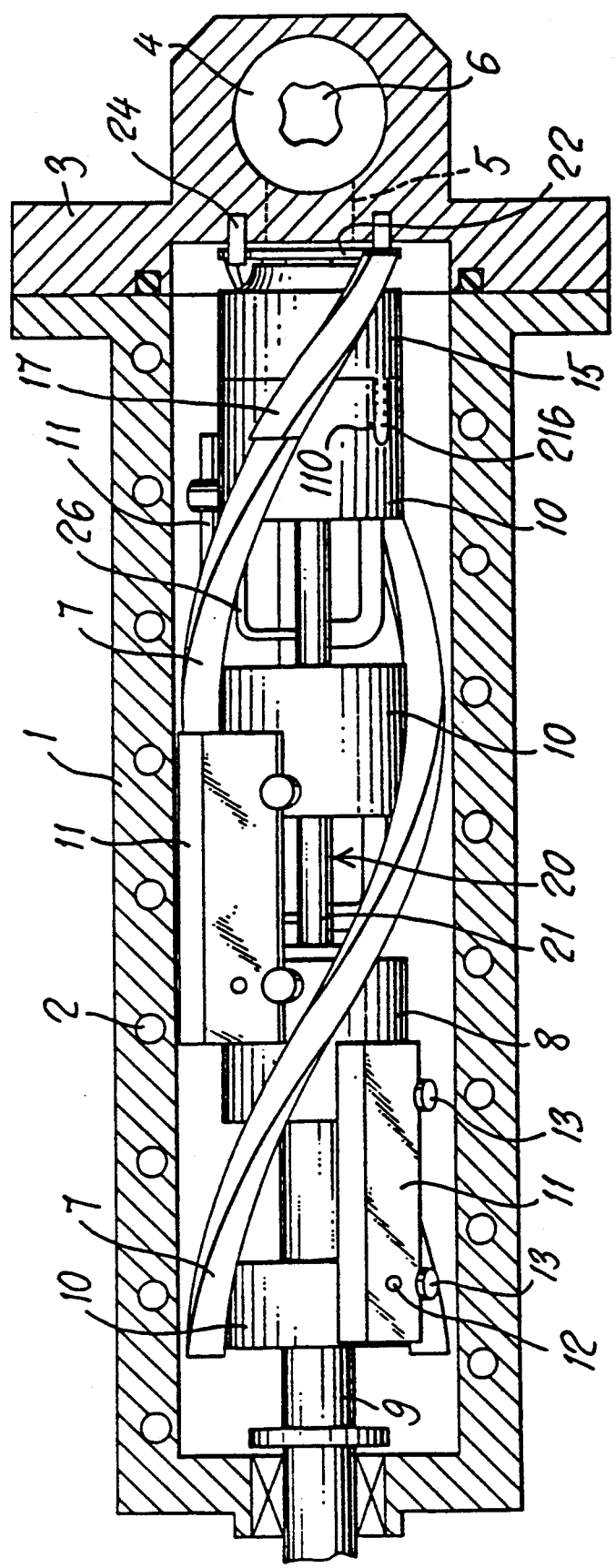

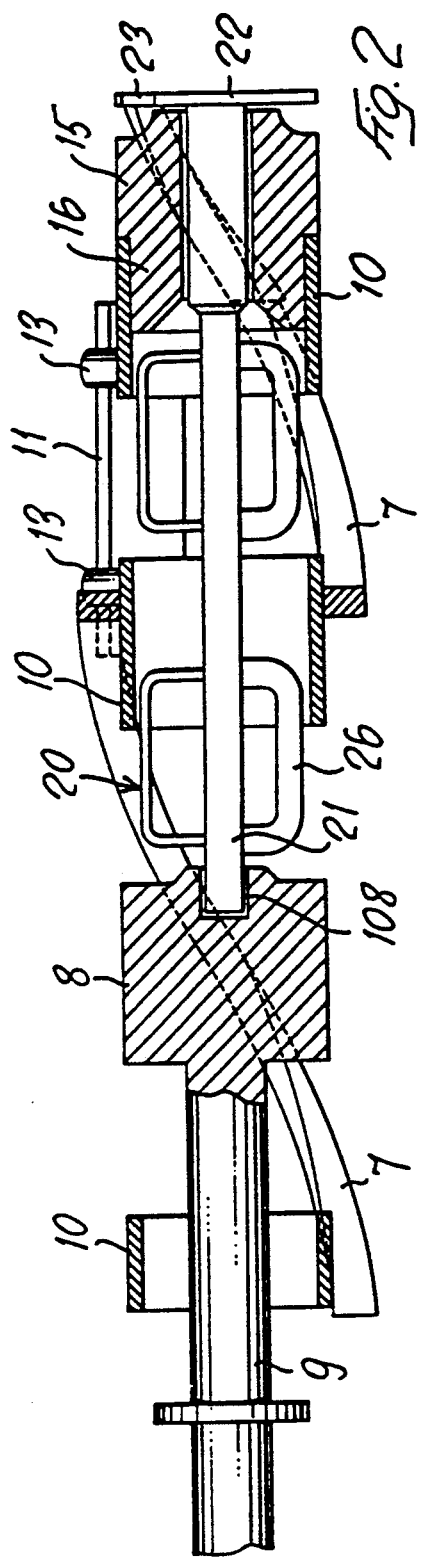
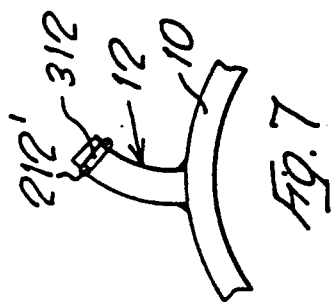
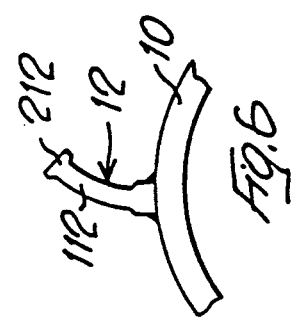
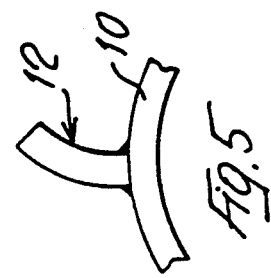

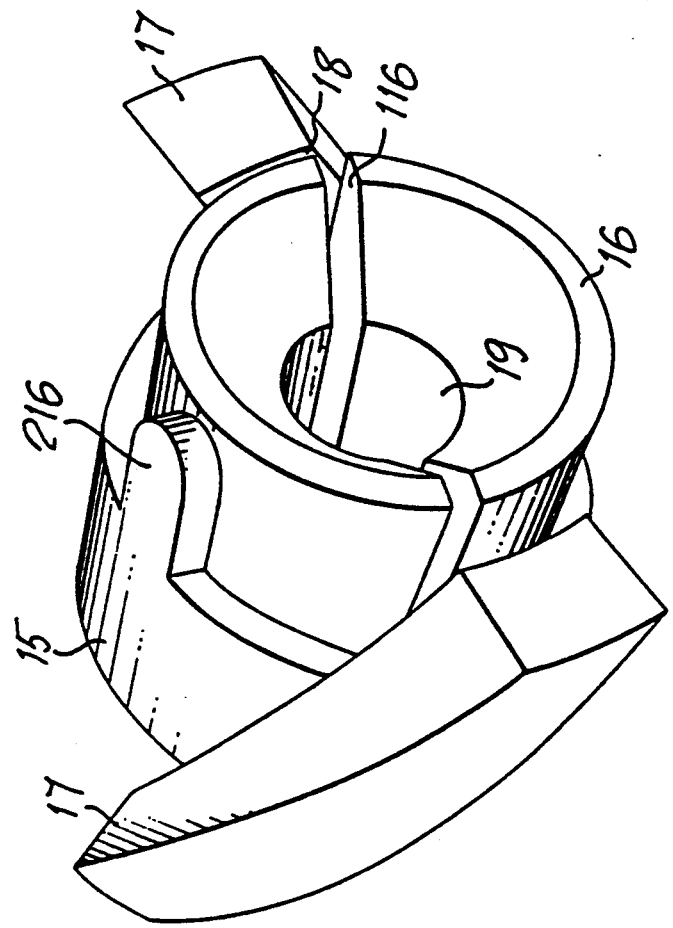
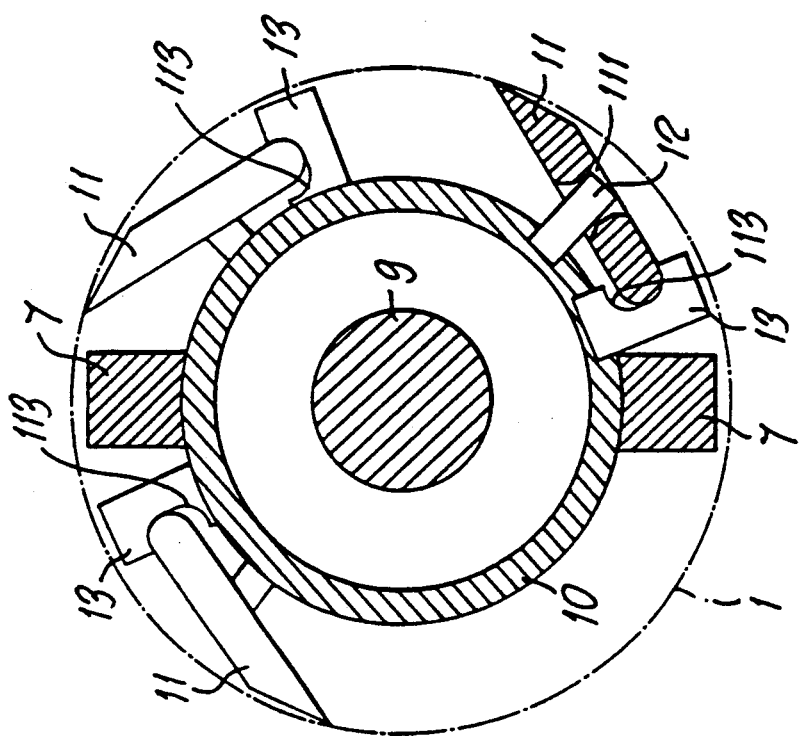

ICE-CREAM STIRRING DEVICE WITH STIRRING BLADES AND SCRAPING VANES

FIELD OF THE DESCRIPTION

The invention relates to a stirring device for machines for the manufacture of ice-cream, of the type with a whipping cylinder with a horizontal axis, provided with means for extraction of the ice-cream at one head. More specifically, it relates to such a stirring device which comprises a peripheral stirrer rotating about the axis of the whipping cylinder.

BACKGROUND OF THE INVENTION

In known devices, the peripheral rotating stirrer generally consists of a pair of stirring/scraping blades of helical shape which are fixed diametrically opposite one another on an operating shaft. The helical blades, in addition to stirring the mass of ice-cream in the whipping cylinder, have the function of scraping from the internal wall of the whipping cylinder the layer of mixture which comes to adhere to the wall. This layer of mixture in fact limits the thermal conduction between the mixture and the wall of the whipping chamber which is in a heat-exchange relationship with the associated refrigeration devices and, if not removed, has a particle size which is too large since it grows without undergoing the mechanical action of mixing. Known stirring devices have, however, considerable disadvantages. From the constructional point of view, for the purpose of guaranteeing both the scraping action and the rotation of the stirrer in a perfectly centered position in the cylinder, the arrangement of the helical blades on the stirrer is subject to the strictest tolerances, adherence to which often requires costly rectification treatments. The whole is made considerably more difficult by the great length of the stirrer itself, as a result of which the manufacture of the stirring device is complex and expensive. From the functional point of view, the helical scraping and stirring blades are subject to considerable wear which compromises their functionality, necessitating laborious and complex maintenance interventions. The rubbing of the stirrer against the whipping cylinder moreover causes the undesirable production of metal dust which contaminates the mixture.

SUMMARY OF THE INVENTION

The aim of the invention is therefore to produce a stirring device of the type described in the introduction, which makes it possible to overcome the disadvantages of known stirring devices, ensuring at the same time greater functional efficiency.

The invention achieves the above mentioned aims by means of a stirring device of the type referred to in the introduction. The peripheral rotating stirrer consists of two stirring blades of helical shape which are diametrically opposite one another and extend essentially over the entire length of the whipping cylinder at a slight distance from the internal wall of the same, the stirring blades being supported on a hub which is integral with the operating shaft. There is provided between the two stirring blades a plurality of scraping vanes which are capable of interacting, with their radially external side, with the internal wall of the whipping cylinder and which are arranged staggered angularly and longitudinally in relation to one another over the length of the whipping cylinder itself.

According to another characteristic of the invention, the scraping vanes are supported on the stirrer in a self-centering and self-adjusting manner. They are freely oscillating both ways in the radial direction of the stirrer and have such an inclination in relation to the radial direction and a scraping edge shaped in such a manner that the action of compression against the internal wall of the whipping cylinder is brought about by the mass of ice-cream or mixture accumulating on their radially internal side.

With reference to the direction of rotation of the stirrer, the scraping vanes are arranged in a set back position in relation to the stirring blades. The stirring blades thus reduce the thickness of the ice-cream deposited on the wall of the whipping cylinder to a fixed thickness of the order of approximately 3 mm. The scraping work of the vanes, which are made of plastic material, therefore causes a constant and low stress on the same, avoiding their bending, while the scraping takes place over the entire line of contact with the chamber.

According to a further improvement, at the terminal end associated with the mouth of the whipping chamber, the stirrer bears a stirring/scraping head which is provided with radial stirring and scraping extensions which form helical prolongations of the stirring blades themselves. The prolongations extend as far as the head of the whipping cylinder for extraction of the ice-cream and are made of such dimensions that they run in contact with the internal wall of the cylinder itself.

Advantageously, the means of support of the stirring blades and of the scraping vanes are made so as to permit the accommodation in the central zone of the peripheral stirrer of a stationary counter-stirrer.

In addition to effectively overcoming the constructional disadvantages of known stirring devices, the stirrer according to the invention has advantages of a functional nature. By avoiding the use of the peripheral helical blades as scraping elements, the stirring of the mixture or of the mass of ice-cream is much more efficient. The scraping vanes also perform their function with greater efficiency. By virtue of their freely oscillating, or self-adjusting, support, they always adhere perfectly to the internal wall of the whipping cylinder without moreover giving rise to any excessive friction, as a result of which the contamination of the ice-cream mixture with dust produced by rubbing is avoided and the stresses of the operating assembly are also reduced.

The invention also relates to other characteristics which further improve the stirring device referred to above and which are the discussed subsequently.

BRIEF DESCRIPTION OF THE DRAWINGS

The characteristic details of the invention and the advantages which derive therefrom will emerge in greater detail from the description of a preferred embodiment, illustrated by way of non-limiting example in the attached drawings, in which:

FIG. 1 illustrates a lateral view of a stirrer according to the invention, accommodated in a whipping cylinder.

FIG. 2 illustrates a view in partial axial cross-section of the stirrer according to FIG. 1.

FIG. 3 illustrates a transverse cross-section through the stirrer according to FIG. 1.

FIG. 4 illustrates a perspective view of the stirring/scraping head.

FIGS. 5 to 7 illustrate respectively an alternative embodiment of the support pins of the scraping vanes.

DETAILED DESCRIPTION OF THE PREFERRED EMBODIMENTS

Figure 8:
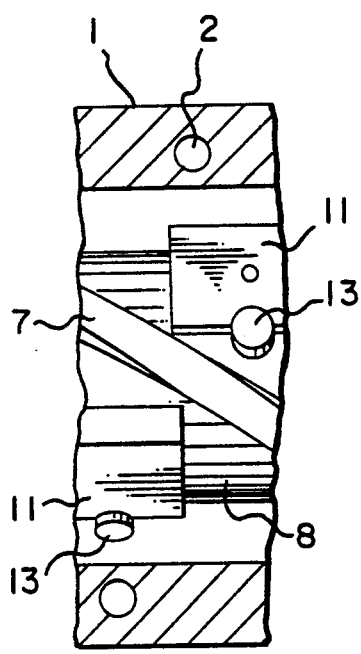
FIG. 8 illustrates a partial lateral view of the stirrer depicted in FIG. 1 but with overlapping vanes.

With reference to FIGS. 1 to 3, 1 indicates the whipping cylinder of a machine for the manufacture of ice-cream. Around the cylinder 1, the serpentine evaporator 2 of a refrigeration device extends. The open side of the whipping cylinder is sealed by a door 3 which comprises a hole 4 for extraction of the ice-cream. Hole 4 communicates, by means of a radial pipe 5, with the inside of the whipping cylinder 1 and, by means of an indented mouth 6, with the outside. The ice-cream is extracted by means of a distribution device, for example a distribution plunger which is slidable in the extraction hole 4 (not illustrated and known per se).

On the inside of the whipping cylinder 1, a coaxial stirring device is accommodated, which comprises two peripheral stirring blades 7 of helical shape. The stirring blades 7 are fixed diametrically opposite one another on a plurality of cylindrical support elements one of which consists of a cylindrical hub 8 which is integral with an operating shaft 9, while the others consist of support bushes 10. The free end of the operating shaft 9 is guided in a rotatable and impermeable manner out of the whipping cylinder 1 and engages with the operating means (not illustrated).

The stirring blades 7 extend over almost the entire length of the whipping cylinder 1, stopping at a given distance from the heads of the cylinder 1 itself. They extend angularly for approximately 270° and are arranged at a slight distance from the internal wall of the whipping cylinder 1. The support elements, or the cylindrical bushes 10 and the hub 8, are distributed essentially equidistantly from one another over the length of the stirring blades 7. In particular, three support bushes 10 are provided, two at the ends of the stirring blades 7, while the hub 8 and the further bush 10 are provided respectively at the intermediate points at which the angular development of the stirring blades 7 is 90° and 180°. The hub 8 thus comes to be situated in an intermediate position of the stirrer, interposed between the respective terminal support bush 10 and that following.

Between the stirring blades 7, three scraping vanes 11 are provided which are each supported by a support element 8, 10 and which extend as far as that following, in particular as far as into the central zone of the same. The three scraping vanes 11 are distributed staggered longitudinally and angularly in relation to one another over the axial length of the stirring blades 7 so as to cover essentially the entire internal surface of the whipping cylinder 1 during the rotation of the stirrer. Their length can also be such that the active bands of the scraping vanes 11 overlap one another, as shown in FIG. 8. As can be seen in particular from FIG. 3, they are arranged inclined radially outwards in relation to a position tangent to the cylindrical support elements (the cylindrical bushes 10 and the hub 8).

The scraping end of the scraping vanes 11 is made tapered in the form of a wedge on the radially external face, while the scraping vanes 11 themselves are supported so as to oscillate both ways in the radial direction. They are made of a suitable plastic material, preferably of a so-called DELRIN (acetal resin) material.

Each scraping vane 11 (see FIG. 3) engages by means of a corresponding hole 111 on a support pin 12 which projects radially outwards from an associated support element 8, 10, that is to say from a support bush 10 or from the hub 8. The holes 111 have a conical widening in the region of each face of the scraping vanes 11, as a result of which the internal wall of the holes 111 themselves is curved, allowing the oscillation of the scraping vane 11 about an axis which is essentially parallel to the axis of the whipping cylinder 1. The angular extent of the oscillation of the scraping vanes 11 is limited by suitable means 13, constituted for example by limiting pins. The limiting pins 13 are fixed so as to project radially from the adjacent support elements 8, 10 between which a scraping vane 11 extends. They are provided with a hollow 113, in which the end of the scraping vanes 11 which is expediently rounded and opposite the scraping end engages. In the radial direction of the stirrer, the hollow 113 has a length which is greater than the thickness of the scraping vanes 11.

During whipping, while the stirring blades 7 stir only the mass of ice-cream, the scraping vanes 11 run along the internal wall of the whipping cylinder 1, scraping the layer of mixture being produced which adheres to the wall. The force of compression of the scraping vanes 11 against the wall of the whipping cylinder 1 is determined by the same mass scraped away from the wall of the cylinder 1 which tends to accumulate on the radially internal face of the scraping vanes 11. The size of the force of compression is limited to low values and rendered uniform for the entire line of contact of the scraping vane 11 with the whipping cylinder 1 by virtue of the action of the stirring blades 7. The stirring blades 7 in fact precede the scraping vanes 11, with reference to the direction of rotation of the stirrer, limiting the thickness of the ice-cream which adheres to the wall of the whipping cylinder 1, preferably to a uniform value of approximately 3 mm. The free oscillation, albeit within a limited angular range, of the scraping vanes 11 guarantees both their perfect adhesion to the internal wall, avoiding at the same time excessive friction, and a self-adjusting action of the vanes, which is capable of automatically making up for effects due to wear.

According to the alternative embodiments in FIGS. 5 to 7, the support pins 12 can also have a curved shape which is capable of further facilitating the oscillation. The support pins 12 can have an intermediate section 112 which is thinner and a widened terminal head 212 which is made in one piece with the pins 12 (FIG. 6) or consists of a removable element, such as for example a ring 212' which can be elastically engaged in an annular groove 312 provided at the free end of the pins themselves.

At the end associated with the door 3, the stirrer bears a head 15, preferably made of suitable plastic material, in particular of so-called DELRIN. The head 15 is provided with an insertion prolongation 16, with which it engages in the associated support bush 10 of the stirring blades 7. This insertion prolongation 16 is provided with a diametral slit 116, while on its external side it has one or more radial anti-rotation projections 216 which are capable of engaging in corresponding hollows 110 of the support bush 10.

On its external side, the head 15 bears a pair of stirring/scraping extensions 17 which are of helical shape and constitute respectively a prolongation of each stirring blade 7 in the direction of the door 3. The stirring/scraping extensions 17 have a greater radial thickness than the stirring blades 7 and extend to make contact against the internal wall of the whipping cylinder 1. They overlap the insertion prolongation 16 at a distance radially from the latter, so as to form a locking slot 18, in which an axial prolongation, beyond the end of the stirring blades 7, of the support bush 10 is accommodated. The stirring/scraping extensions 17 extend as far as the door 3 itself. This guarantees a better delivery and an efficient compression of the mass of ice-cream in the connecting pipe 5 to the extraction hole 6.

According to another characteristic of the stirring device inside the support bushes 10, a stationary counter-stirrer 20 is accommodated coaxially. The counter-stirrer 20 is known per se and has a support shaft 21 on which the stirring elements 26 are fixed. These stirring elements 26 consist of U-shaped rod-type elements which are secured in diametrically opposite pairs on the shaft 21 and the radial extension of which is smaller than the internal diameter of the support bushes 10 for the stirring blades 7. The support shaft 21 engages in a mutually rotatable manner in relation to the latter in a coaxial seat 108 provided on the free head side of the hub 8. Its end which is associated with the door 3 is guided beyond the stirring/scraping head 15 in a rotatable manner in relation to the same through a coaxial hole 19. The corresponding terminal end of the counter-stirrer 20 itself bears a transverse plate 22 provided with two hollows or notches 23 on the two opposite sides of its ends. The hollows or notches 23 are capable of engaging with pins 24 which project axially from the internal side of the door 3, so as to prevent the rotation of the counter-stirrer 20. The transverse plate 22 clearly has a length which is smaller than the external diameter of the stirring/scraping head 15, so as not to interfere with the stirring/scraping extensions 17 of the same.

The invention is of course not limited to the embodiments which have just been described and illustrated but can be widely varied and modified, above all constructively, without departing from the guiding principle explained above.

I claim:

1. A stirring device for a machine used for the manufacture of ice cream, which machine includes a whipping cylinder having a horizontal axis about which an operating shaft rotates and a means for extracting of the ice cream at a head side of the whipping cylinder, said stirring device comprising:

a peripheral stirrer which is rotated about the axis of the whipping cylinder inside of the whipping cylinder, said stirrer including a hub which is integral with the operating shaft so as to rotate therewith, two stirring blades of helical shape supported on said hub, said stirring blades being arranged diametrically opposite to one another and extending over a majority of an entire length of the whipping cylinder at a slight distance from an internal wall of the whipping cylinder, at least one support bush spaced from said hub toward the head side and connected to said stirring blades, said support bush having a hollow adjacent to the head side, a plurality of scraping vanes, each said scraping vane including a radially external side, a vane support means for supporting said vanes on said hub and said support bush between said two stirring blades and said vanes being distributed longitudinally over the length of the whipping cylinder in an angularly staggered and longitudinally staggered relationship, such that said radially external side of each said scraping vane interacts with the internal wall of the whipping cylinder, and a stirring/scraping head adjacent the head side of the whipping cylinder, said head including an insertion prolongation having a radial anti-rotation extension extending longitudinally away from the head side, said head being received in a portion of said support bush such that said anti-rotation extension is engaged in said hollow of said support bush.

2. A stirring device as claimed in claim 1 wherein said vane support means angularly orients said scraping vanes in a direction of rotation of said stirrer so that said external sides of said scraping vanes are inclined radially outward against the internal wall of the whipping cylinder.

3. A stirring device as claimed in claim 2 wherein said vane support means supports each said scraping vane in a self-centering and self-supporting manner.

4. A stirring device as claimed in claim 3 wherein said vane support means also supports said scraping vanes at an inclination to a radial direction of said stirrer and includes a means for oscillating each radial end of said scraping vanes independently of the other said ends; and wherein each said scraping vane has a similarly inclined scraping edge such that a compressive force is exerted against a radially internal side of each said scraping vane during rotation of said stirrer which causes said scraping edge to be pushed toward the internal wall of the whipping cylinder.

5. A stirring device as claimed in claim 2 wherein said vane support means supports each said scraping vane relative to a most adjacent said stirring blade such that the most adjacent said stirring blade precedes the relative said scraping vane during rotation.

6. A stirring device as claimed in claim 1 wherein said head further includes radial extensions which extend toward the head side of the whipping cylinder for stirring and scraping the ice cream adjacent the head side.

7. A stirring device as claimed in claim 6 wherein said radial extensions of said head are helical projections of said stirring blades which contact the head side of the whipping cylinder.

8. A stirring device as claimed in claim 7 wherein said insertion prolongation includes a radial slot therein which extends longitudinally from a free end of said insertion prolongation; wherein said radial extensions of said head overlap said insertion prolongation and are spaced therefrom a short distance, forming a locking slot; and wherein said portion of said at least one support bush extends beyond said stirring blades toward said head side and is received in said locking slot.

9. A stirring device as claimed in claim 1 wherein said vane support means includes at least one hole in each said scraping vane and a radial support pin extending from an associated one of said hub and said at least one support bush through said hole such that each said scraping vane is mounted for oscillatory movement about an axis parallel to the horizontal axis of the whipping cylinder.

10. A stirring device as claimed in claim 9 wherein said hole in each said scraping vane widens conically from a central portion thereof toward said external side and an internal side thereof.

11. A stirring device as claimed in claim 9 wherein each said radial support pin is curved opposite to a direction of rotation of said stirrer.

12. A stirring device as claimed in claim 11 wherein each said radial support pin includes an enlarged terminal head.

13. A stirring device as claimed in claim 9 wherein each said radial support pin includes an enlarged terminal head.

14. A stirring device as claimed in claim 9 wherein said vane support means further includes a respective limit means for limiting an angle of oscillation each respective said scraping vane.

15. A stirring device as claimed in claim 14 wherein each said limit means includes a rounded inner edge of the associated said scraping vane and a pair of axially spaced radial pins, each said radial pin including a rounded hollow along a radial portion thereof which hollow is longer than a thickness of said scraping vane such that said inner edge is only loosely received in said hollow.

16. A stirring device as claimed in claim 15 wherein said at least one support bush includes a plurality of support bushes which together with said hub form a plurality of support elements, said support elements being spaced equidistantly along a length of said two stirring blades.

17. A stirring device as claimed in claim 16 wherein each said scraping vane extends between adjacent said support elements; and wherein each said support pin for an associated said scraping vane is provided on one of the associated adjacent said support elements and said pair of radial pins for the associated said scraping vane are provided on respective ones of the associated adjacent said support elements.

18. A stirring device as claimed in claim 17 wherein each said scraping vane has a length such that each said scraping vane scrapes a band along the internal wall of the whipping cylinder which axially overlaps with a band scraped by an adjacent said scraping vane.

19. A stirring device as claimed in claim 16 wherein said support elements are cylindrically shaped and have equal outside diameters.

20. A stirring device as claimed in claim 19 wherein there are three of said support bushes, respective ones of said support bushes being located at respective ends of said stirring blades, and wherein there are three of said scraping vanes.

21. A stirring device as claimed in claim 19 wherein the helical shape of said stirring blades extends over a helical development of about 270°, and wherein a respective said support element is provided at every 90° of helical development.

22. A stirring device as claimed in claim 1 wherein said hub includes a seat coaxial with the horizontal axis and said head includes a through-hole coaxial with the horizontal axis; and further including a stationary counter-stirrer located inside of said peripheral stirrer having
a support shaft which has a first end freely accommodated for rotation in said seat, said support shaft being rotatably received in said through-hole and having a second end projecting beyond said head,
stirring elements attached to said support shaft having radial dimensions which are less than an internal diameter of said at least one support bush, and
an anti-rotation means which removably engages the head side of the whipping cylinder for preventing relative rotation of said second end of said support shaft and hence of said counter-stirrer in the whipping cylinder.

23. A stirring device as claimed in claim 1 wherein said head and said scraping vanes are made of an acetal resin material.

* * * * *